(12) United States Patent  
Wrobleski (10) Patent No.: US 8,727,368 B1
(45) Date of Patent: May 20, 2014

(54) BICYCLE FRAME WITH INTEGRATED TOOL STORAGE

(71) Applicant: Specialized Bicycle Components, Inc., Morgan Hill, CA (US)

(72) Inventor: Dennis John Wrobleski, San Jose, CA (US)

(73) Assignee: Specialized Bicycle Components, Inc., Morgan Hill, CA (US)

( * ) Notice: Subject to any disclaimer, the term of this patent is extended or adjusted under 35 U.S.C. 154(b) by 2 days.

(21) Appl. No.: 13/663,200

(22) Filed: Oct. 29, 2012

(51) Int. Cl.
 *B62K 3/02* (2006.01)
 *B62J 11/00* (2006.01)

(52) U.S. Cl.
 USPC ............... 280/281.1; 280/288.4; 280/274; 280/288.3; 224/425; 224/426

(58) Field of Classification Search
 USPC .................. 280/281.1, 288.4, 274, 288.3; 224/425–426
 See application file for complete search history.

(56) References Cited

U.S. PATENT DOCUMENTS

| | | | | |
|---|---|---|---|---|
| 4,071,175 A * | 1/1978 | Wagnon | | 224/414 |
| 4,368,897 A | 1/1983 | Brown | | |
| 4,640,449 A * | 2/1987 | Blackburn | | 224/414 |
| 4,688,705 A | 8/1987 | Miree | | |
| 4,856,744 A * | 8/1989 | Frankel | | 248/215 |
| RE33,295 E | 8/1990 | Trimble | | |
| 5,201,442 A * | 4/1993 | Bakalian | | 222/610 |
| 5,328,194 A | 7/1994 | Buckler | | |
| 5,810,228 A * | 9/1998 | Brokering | | 224/414 |
| 6,253,979 B1 * | 7/2001 | Samson | | 224/426 |
| 6,401,997 B1 * | 6/2002 | Smerdon, Jr. | | 224/414 |
| 6,543,660 B2 * | 4/2003 | Young et al. | | 224/414 |
| 6,616,021 B1 * | 9/2003 | Shih | | 224/414 |
| 7,147,238 B2 * | 12/2006 | Oi | | 280/281.1 |
| 7,988,175 B2 * | 8/2011 | White | | 280/281.1 |
| 8,066,296 B2 * | 11/2011 | White | | 280/281.1 |
| 2002/0179662 A1 * | 12/2002 | Young et al. | | 224/414 |
| 2003/0102647 A1 | 6/2003 | Morrone | | |
| 2003/0106974 A1 * | 6/2003 | Guertin | | 248/309.1 |
| 2007/0278273 A1 * | 12/2007 | Hollis | | 224/414 |
| 2010/0257973 A1 | 10/2010 | White | | |
| 2011/0031287 A1 * | 2/2011 | Le Gette et al. | | 224/101 |

FOREIGN PATENT DOCUMENTS

| | | |
|---|---|---|
| CN | 2608403 | 3/2004 |
| CN | 2705380 | 6/2005 |
| DE | 4420170 | 12/1995 |

* cited by examiner

*Primary Examiner* — Joseph M Rocca
*Assistant Examiner* — Marlon Arce
(74) *Attorney, Agent, or Firm* — Michael Best & Friedrich LLP (57) ABSTRACT

A bicycle including front and rear wheels, a main frame that has a mounting bracket, and a front fork that connects the main frame to the front wheel. The bicycle also includes a rear sub-frame that connects the main frame to the rear wheel and that is movable relative to the main frame, and a shock that is positioned to dampen movement between the main frame and the sub-frame. The shock has a front mount that is secured to the mounting bracket and that defines a space between the front mount and the main frame, and a bicycle accessory is positioned in the space.

19 Claims, 7 Drawing Sheets

BICYCLE FRAME WITH INTEGRATED TOOL STORAGE

BACKGROUND

The present invention relates to bicycles and specifically to bicycle frames that facilitate storage of items on the frame.

Bicycles commonly include devices for mounting bicycle accessories, such as water bottles and tools. For example, water bottle cages are often used to secure a water bottle to a frame tube, and tool pouches are often used to secure tools to a bicycle seat. In addition, bike computers and bells are frequently attached to mounting brackets attached to the handlebars of the bicycle. Other bicycle accessories that can be stored on a bicycle include pumps, CO2 cartridges, spare tubes, etc.

SUMMARY

The present invention provides a storage device that facilitates storage of accessories on a bicycle frame. In one embodiment, the invention provides a bicycle including front and rear wheels, a main frame that has a mounting bracket, and a front fork that connects the main frame to the front wheel. The bicycle also includes a rear sub-frame that connects the main frame to the rear wheel and that is movable relative to the main frame, and a shock that is positioned to dampen movement between the main frame and the sub-frame. The shock has a front mount that is secured to the mounting bracket and that defines a space between the front mount and the main frame, and a bicycle accessory is positioned in the space.

In another embodiment, the invention provides a bicycle accessory assembly that includes a cradle comprising a resilient member, and an accessory positioned in the cradle and held in the cradle by the resilient member.

In another embodiment, the invention provides a bicycle including front and rear wheels, and a main frame that has a mounting bracket, and a front fork connecting the main frame to the front wheel. The mounting bracket has a first side flange and a second side flange cooperatively supporting a suspension pivot, and the second side flange is separated from the first side flange to define a space. The bicycle also includes a rear sub-frame connecting the main frame to the rear wheel and movable relative to the main frame, a shock positioned to dampen movement between the main frame and the sub-frame, and a bicycle accessory positioned in the space. The shock includes a front mount that is secured to the suspension pivot.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
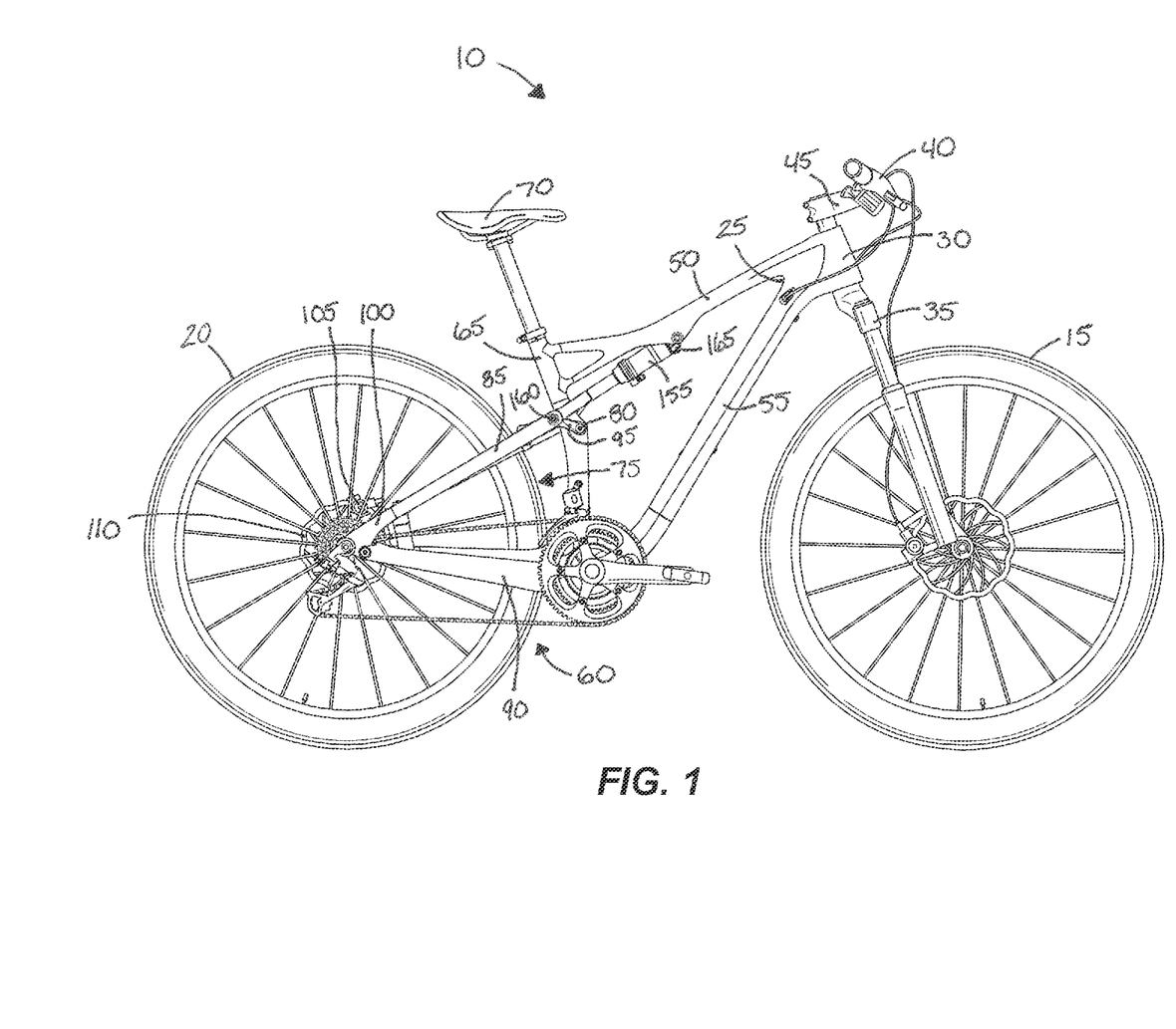
FIG. 1 is a perspective view of a bicycle including a frame embodying the present invention.

FIG. 1 shows a bicycle 10 that includes a front wheel 15, a rear wheel 20, and a main frame 25. The frame 25 has a head tube 30 and a front fork 35 that is rotationally supported by the head tube 30 and that secures the front wheel 15 to the frame 25. A handlebar assembly 40 is coupled to the head tube 30 and is secured to the front fork 35 by a stem assembly 45 such that movement of the handlebar assembly 40 results in movement of the stem assembly 45 and the fork 35. The frame 25 also has a top tube 50 connected to and extending rearward from the head tube 30, and a down tube 55 connected to the head tube 30 below the top tube 50 and extending generally downward toward a drive train 60. A seat tube 65 is connected to the top tube 50 and the down tube 55, and a seat 70 is supported by the seat tube 65.

The frame 25 further includes a rear triangle or sub-frame 75 connected to the rear wheel 20. With continued reference to FIG. 1, the illustrated sub-frame 75 connects the frame 25 to the rear wheel 20 and is movable (e.g., pivotable) relative to the frame 25 about a frame pivot 80 coupled to the seat tube 65. The sub-frame 75 includes right and left seat stays 85 (one shown), and right and left chain stays 90 (one shown). Each seat stay defines a shock attachment 95 adjacent a forward end of the seat stay. Rear dropouts 100 (one shown) are disposed at lower ends of the left and right seat stays 85 and the rearward ends of the chain stays 90. The dropouts rotatably secure the rear wheel 20 to the sub-frame 75. A rear brake mount 105 is attached to the sub-frame 75 adjacent the left rear dropout and supports a rear brake 110 (e.g., a disc brake).

Figure 3:
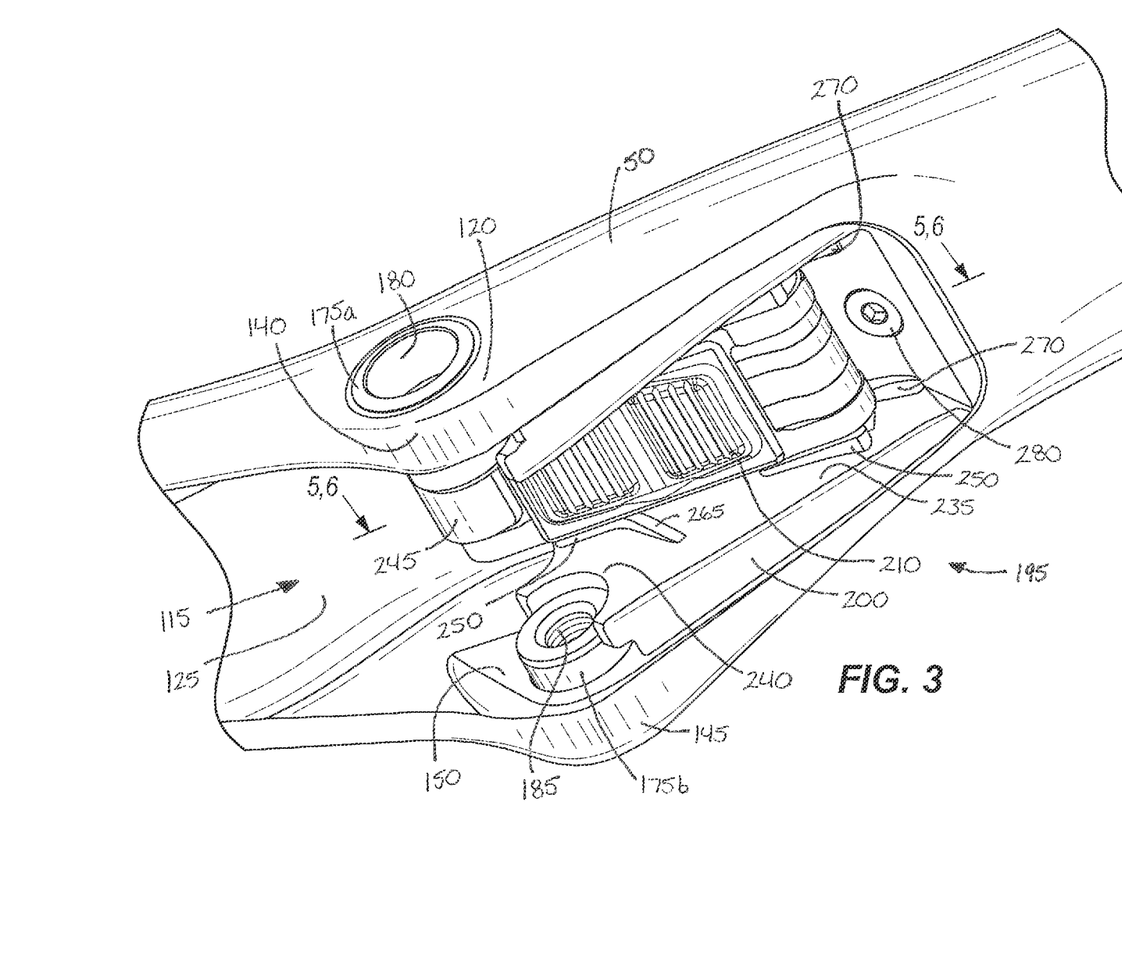
FIG. 3 is a perspective view of a portion of the frame without the shock mount and illustrating the space and the bicycle accessory disposed in the space.
Figure 4:
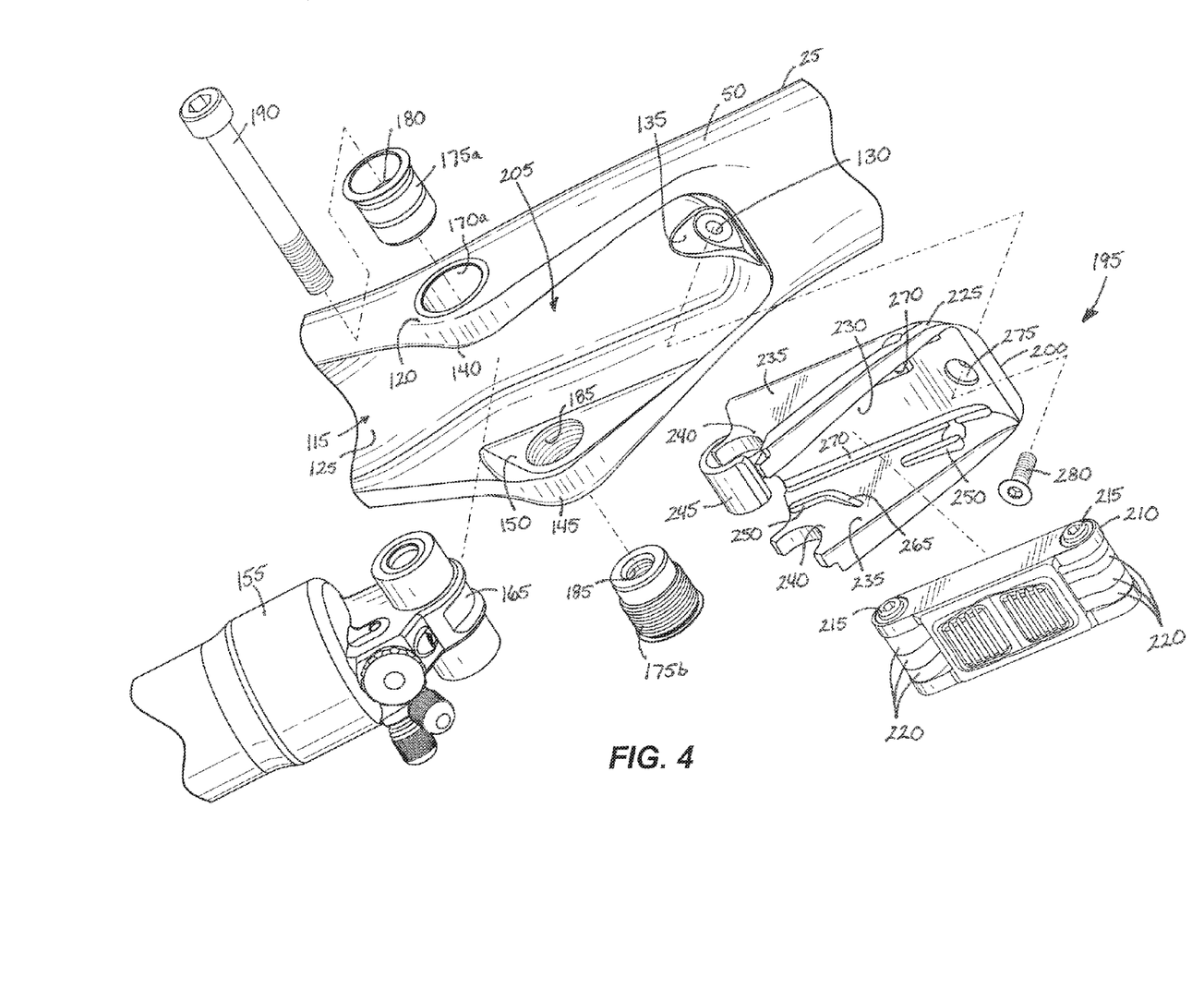
FIG. 4 is an exploded perspective view of the assembly of FIG. 3.
Figure 5:
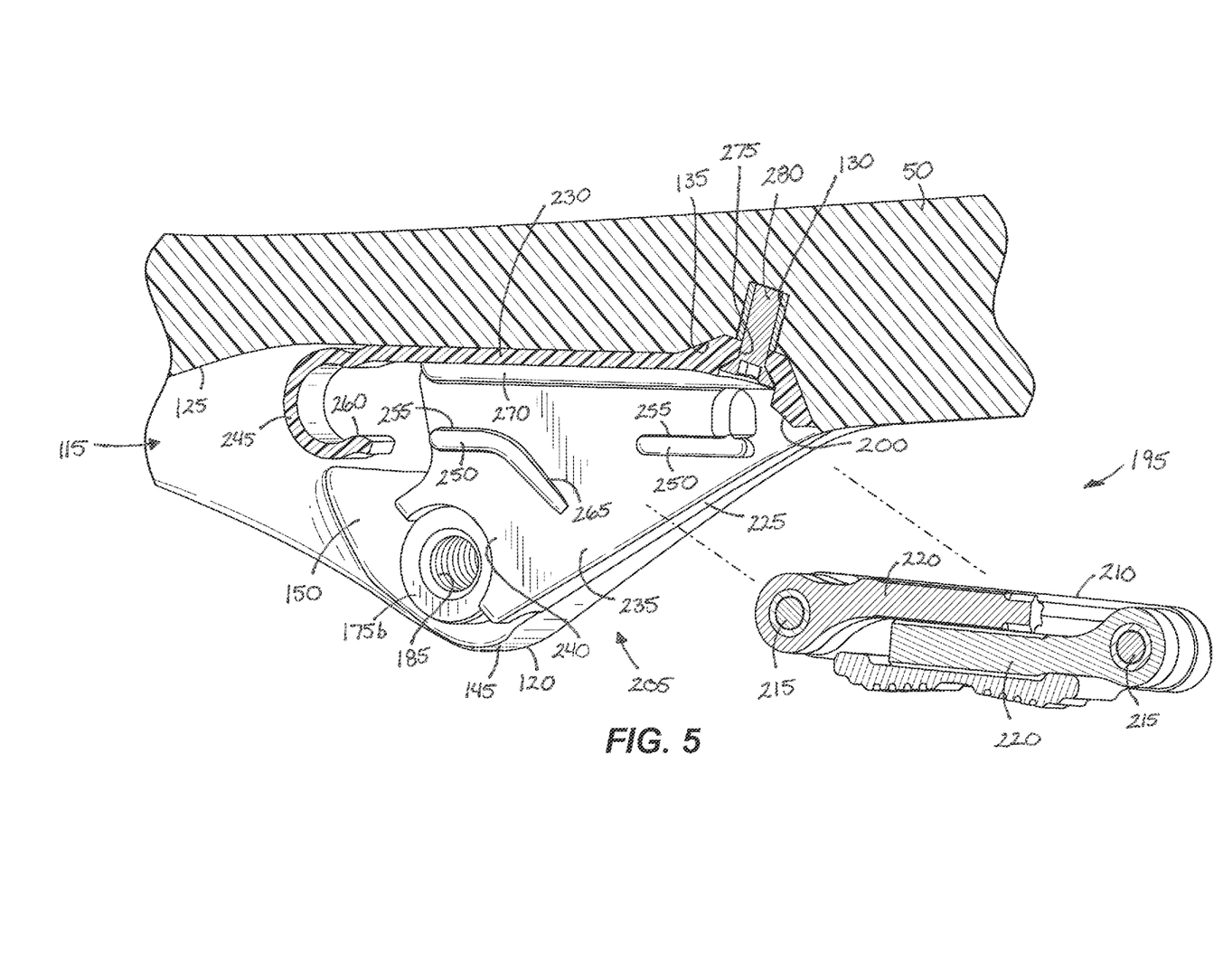
FIG. 5 is a section view taken along line 5-5 of FIG. 3 with the bicycle accessory exploded from the frame.
Figure 6:
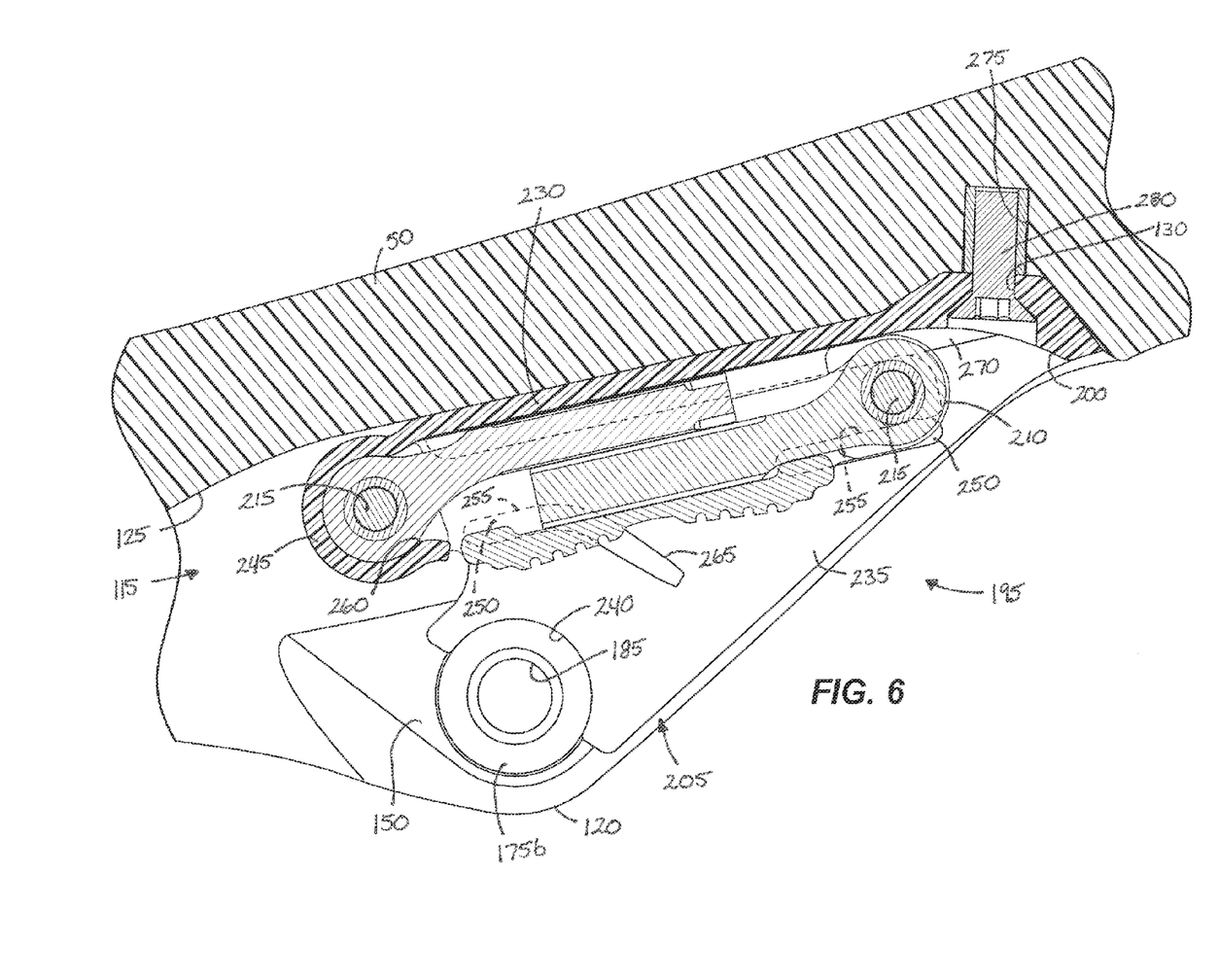
FIG. 6 is a section view taken along line 6-6 of FIG. 3.

With reference to FIGS. 3-7, a cavity 115 is disposed in and extends along the underside of the top tube 50, and a mounting bracket 120 is formed in the top tube 50 adjacent the cavity 115. With reference to FIGS. 4-6, the cavity 115 is defined by a recessed wall 125 of the top tube 50, and a fastener hole 130 extends into the top tube 50 within a recessed section 135 of the cavity 115. The fastener hole 130 is located near a forward end of the cavity 115 relative to the direction of travel for the bicycle. Although the illustrated cavity 115 is provided in the top tube 50, the cavity 115 can be disposed in other portions of the frame 25 (e.g., the down tube 55, the seat tube 65, etc.).

Figure 2:
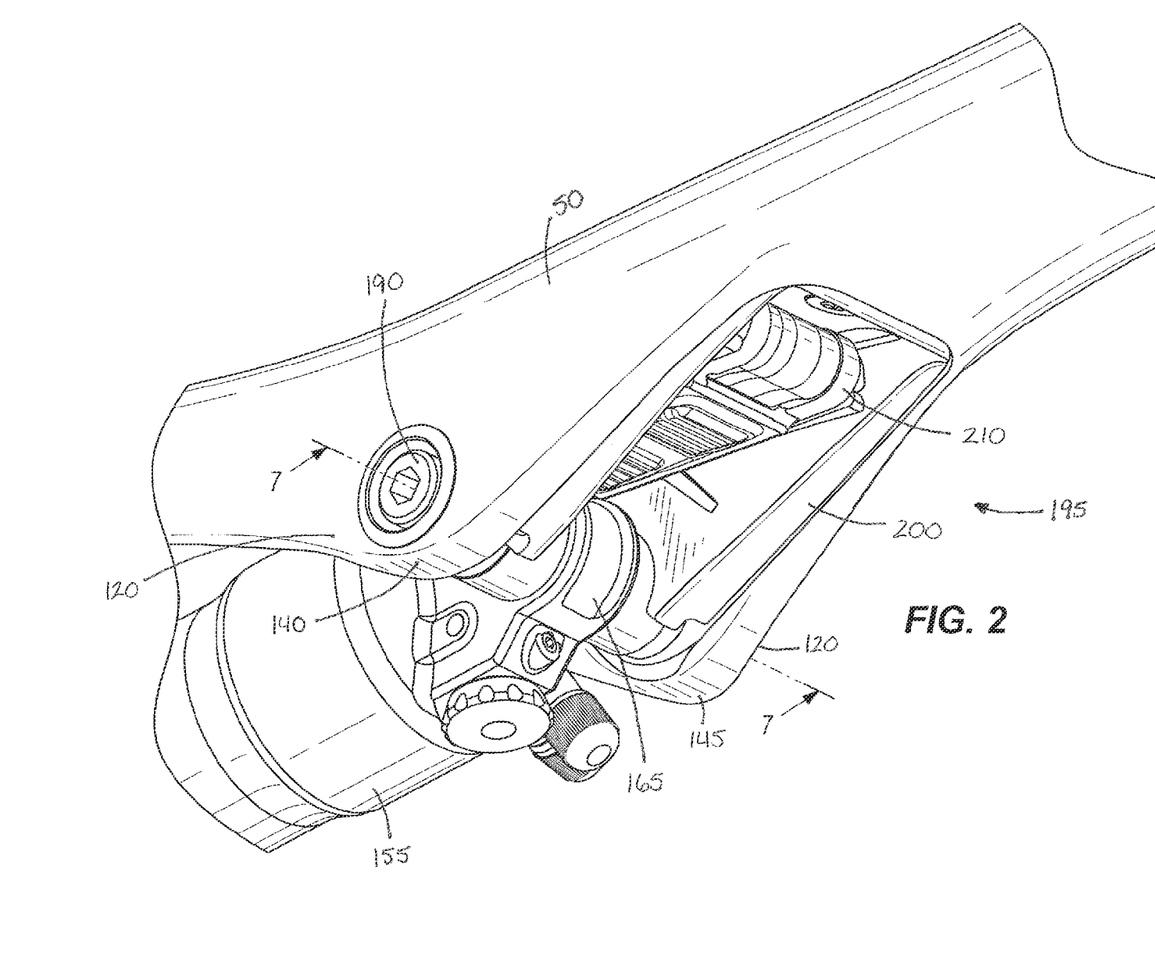
FIG. 2 is a perspective view of a portion of the frame illustrating a shock mount secured to a mounting bracket on the frame and defining a space between the shock mount and the mounting bracket to support a bicycle accessory.

As illustrated in FIGS. 3 and 4, the mounting bracket 120 has a first side flange 140 and a second side flange 145 that is separated from the first side flange 140. The first and second side flanges 140, 145 extend outward (downward) from the top tube 50 such that the mounting bracket 120 forms an enlarged section of the top tube 50 (see FIGS. 1 and 2). The illustrated side flanges 140, 145 are generally triangular-shaped, although the side flanges 140, 145 can have any suitable shape. Also, as shown in FIG. 4, each side flange 140, 145 has a raised platform 150 along its inward facing wall, although the side flanges 140, 145 can be provided without the raised platform 150. Although the mounting bracket 120 is illustrated as being integrally formed as part of the top tube 50, it could instead be a separate part that is coupled to the top tube 50.

With reference to FIGS. 1, 2, and 4, a shock 155 is coupled between the top tube 50 and the seat stays 85 to dampen movement between the frame 25 and the sub-frame 75. The shock 155 has a rear mount 160 that is attached to the shock attachment 95 of the sub-frame 75, and a front mount 165 that is attached to the mounting bracket 120. As illustrated, the first and second side flanges 140, 145 have axially aligned holes 170a, 170b that receive structural bosses or inserts 175a, 175b (e.g., shock reducers). Generally, the inserts 175a, 175b are sized according to the size (e.g., width) of the front mount 165. In some constructions, the inserts 175a, 175b may be integrally formed in the side flanges 140.

Figure 7:
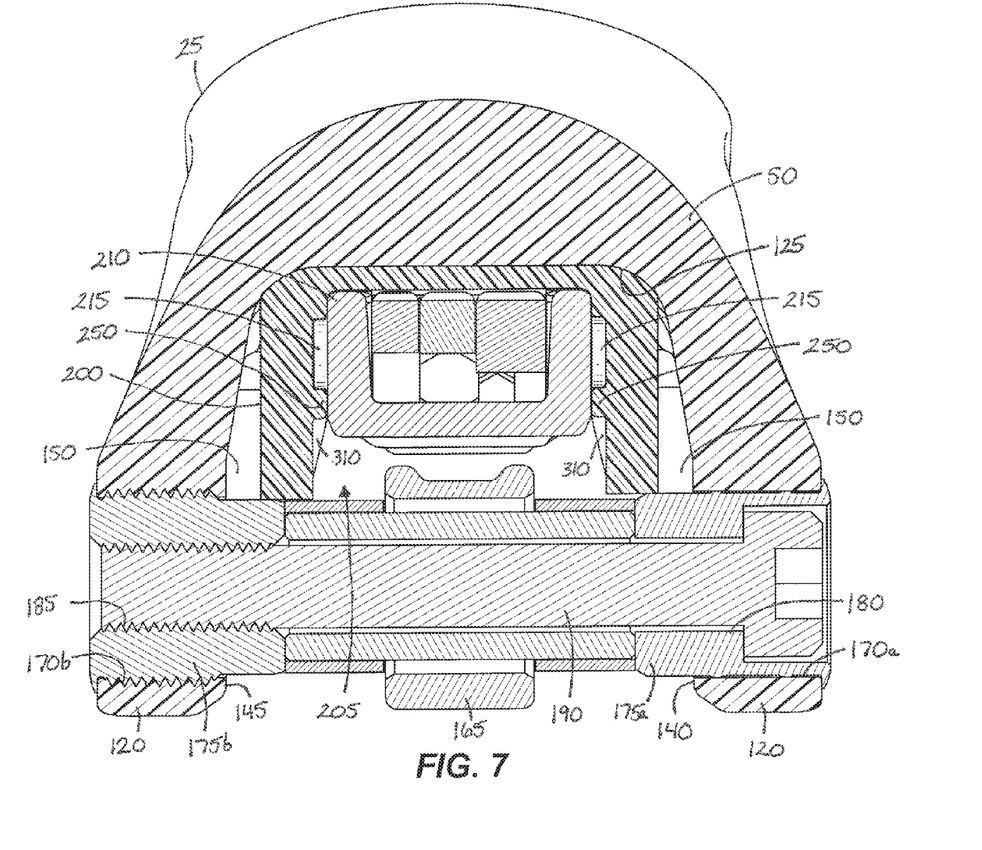
FIG. 7 is a section view of the frame taken along line 7-7 of FIG. 2 and illustrating the space and the bicycle accessory disposed in the space.

FIG. 4 shows that the hole 170a of the first side flange 140 is unthreaded to accommodate the non-threaded insert 175a, and the hole 170b of the second side flange 145 is threaded (e.g., left-hand threaded) to accommodate the threaded insert 175b, although either or both holes 170a, 170b can be threaded or unthreaded based on the inserts 175a, 175b to be used. As illustrated, the insert 175a attached to the first side flange 140 has an unthreaded interior passageway 180, and the insert 175b attached to the second side flange 145 has an interior threaded passageway 185 (e.g., right-hand threaded). As shown in FIGS. 2 and 7, the first and second side flanges 140, 145 (and the inserts 175a, 175b, when provided) cooperatively support a suspension pivot 190 (e.g., a fastener such as a bolt) that pivotably supports the front mount 165 of the shock 155.

With reference to FIGS. 3-7, a bicycle accessory 195 is coupled to the top tube 50 within a space 205 cooperatively defined by the cavity 115 and the area between the side flanges 140. That is, the space 205 in which the bicycle accessory 195 is supported is located between the front mount 165 of the shock 155 and the interior recessed wall 125 of the top tube 50.

The bicycle accessory 195 includes a cradle 200 that is disposed in the space 205, and a tool 210 that is coupled to and supported by the cradle 200. The cradle 200 is engaged with the top tube 50, and can be formed from plastic, metal, composite, or other material. The illustrated tool 210 is a multi-tool accessory that has pins or axles 215 and a plurality of tool components 220 that pivot about one of the axles 215, although the tool 210 can include other types of bicycle accessory components.

The illustrated cradle 200 is defined by a substantially triangular-shaped shell 225 (when viewed from the side) that supports the tool 210. The shell 225 is engaged with the recessed wall 125 of the top tube 50 and the interior walls of the side flanges 140. As shown, the cradle 200 includes a central wall or backbone 230 (defining one leg of the triangular-shaped shell 225), and sidewalls 235 that are coupled to and extend outward from the backbone 230 (defining the second leg and the hypotenuse of the triangular-shaped shell 225). Each sidewall 235 defines a forked end 240 that at least partially wraps around the corresponding insert 175a, 175b to support the rearward end of the cradle 200 in the top tube 50. As shown, the forked ends 240 are spaced from the backbone 230.

Referring to FIGS. 3-7, the cradle 200 also includes a resilient member 245 connected to and extending from the backbone 230 to support an end of the bicycle accessory 195, and support members 250 that extend inward from the sidewalls 235 to define ledges 255 that support sides of the accessory 195. The illustrated resilient member 245 is hook-like and defines an arcuate pocket that has a ridge 260 to define a snap-fit arrangement between the cradle 200 and the accessory 195. Generally, the tool 210 is resiliently held in the cradle 200 by the resilient member 245, and the support members 250 are spaced from the backbone 230 and support the accessory 195 within the cradle 200 when the accessory 195 is snapped into the resilient member 245. That is, the accessory 195 is positioned between the backbone 230 and the support members 250 and is supported on the ledges 255 when the accessory 195 is completely inserted into the cradle 200. As shown in FIG. 6, the support members 250 are parallel or substantially parallel to the backbone 230, and the cradle 200 includes a ramp member 265 that is coupled to the rearward-most support member 250 on each sidewall. Each ramp member 265 is obliquely oriented relative to the support member 250 to guide the tool into the cradle 200.

With reference to FIGS. 4-6, the illustrated cradle 200 also can include opposed ribs 270 that are located between the backbone 230 and the support members 250 (e.g., disposed at the juncture between the backbone 230 and the sidewalls 235). The ribs 270 guide the tool during installation and removal relative to the cradle 200, and limit upward movement of the accessory 195 when the accessory 195 is positioned within the cradle 200. In other words, each rib 270 cooperates with the support member 250 on the same sidewall to sandwich the accessory 195 in the cradle 200. In other constructions, the cradle 200 can be provided without the ribs 270.

With reference to FIGS. 4-6, when the cradle 200 is attached to the top tube 50, the forward or "nose" end of the cradle 200 is nested in the recessed section 135 of the cavity 115, and the rearward end of the cradle 200 abuts the inserts 175a, 175b. As illustrated, a hole 275 extending through the forward end is aligned with the fastener hole 130 in the top tube 50 so that a fastener 280 can secure the forward end of the cradle 200 to the top tube 50.

The bicycle accessory 195 can be installed in the frame 25 by inserting the inserts 175a, 175b into their respective holes 170a, 170b, and then inserting the cradle 200 into the space 205. The forked ends 240 are oriented to abut and at least partially wrap around the inserts 175a, 175b, and the cradle 200 is then pivoted about the inserts 175a, 175b so that the nose end is nested in the recessed section 135. The fastener 280 can then be threaded into the fastener hole 130. As illustrated, the forked ends 240 and the fastener 280 cooperate to secure the cradle 200 in place within the space 205. The shock 155 can be attached to the sub-frame 75 and the mounting bracket 120 before or after the cradle 200 is secured to the top tube 50.

With reference to FIGS. 5-7, the tool 210 is coupled to the cradle 200 by aligning the tool with the ramp members 265 and guiding the rearward-most axle 215 along the ramp members 265 into engagement with the rearward-most support members 250 and the ribs 270. As the tool 210 is inserted, the outer ends of the axle 215 are supported by the ledges 255 of the rearward-most support members 250 (see FIG. 7). With the tool 210 partially supported in the cradle 200, the other end of the tool 210 is pivoted upward to a position in which the forward-most axle 215 is aligned with the forward-most support members 250 and the ribs 270. The tool 210 then slides further rearward between the support members 250 and the ribs 270 until the rear end of the tool 210 is engaged with the pocket of the resilient member 245.

In this way, the tool 210 is slidably engageable with the cradle 200 so that the tool 210 can be stored in the frame 25 and hidden from view. The snap fit arrangement provided by the resilient member 245 and the ridge 260 holds the tool 210 in the cradle 200, while the support members 250 and the ribs 270 keep the tool 210 in place within the space 205 until it is desired to remove the tool 210 from the top tube 50. The tool 210 can be coupled to the cradle 200 before or after the shock 155 is attached to the frame 25.

The cradle 200 illustrated in FIGS. 2-7 and described above utilizes the area in which the shock 155 is mounted to the frame 25 to integrate a bicycle accessory 195 into the frame 25 while keeping the accessory 195 hidden from view. Moreover, the resilient member 245 and the support members 250 provide an accessory clip that is secured to the frame 25 and that facilitates attachment and detachment of a bicycle accessory 195 to the frame 25 to provide quick access to the accessory 195 without opening a hatch or a door.

Various features and advantages of the invention are set forth in the following claims.

The invention claimed is:

1. A bicycle comprising:
   front and rear wheels;
   a main frame including a mounting bracket;
   a front fork connecting the main frame to the front wheel;
   a rear sub-frame connecting the main frame to the rear wheel and movable relative to the main frame;
   a shock positioned to dampen movement between the main frame and the sub-frame, the shock including a front mount secured to the mounting bracket and defining a space between the front mount and the main frame; and
   a bicycle accessory positioned in the space.

2. A bicycle as claimed in claim 1, wherein the mounting bracket comprises two side flanges and wherein the front mount is positioned between the two side flanges.

3. A bicycle as claimed in claim 1, wherein the bicycle accessory includes a cradle positioned in the space.

4. A bicycle as claimed in claim 3, wherein the frame includes a tube, and wherein the cradle is secured to the tube.

5. A bicycle as claimed in claim 3, further comprising an insert positioned between the mounting bracket and the front mount, and wherein the cradle includes a forked end at least partially wrapped around the insert.

6. A bicycle as claimed in claim 3, wherein the bicycle accessory further includes a tool secured to the cradle.

7. A bicycle as claimed in claim 6, wherein the cradle comprises a resilient member that resiliently holds the tool engaged with the cradle.

8. A bicycle as claimed in claim 6, wherein the cradle includes a support member engaged with the tool.

9. A bicycle as claimed in claim 8, wherein the cradle includes a backbone and wherein the support member is parallel with the backbone.

10. A bicycle as claimed in claim 9, wherein the cradle further includes a ramp member oblique to the support member and adapted to guide the tool into the cradle.

11. A bicycle accessory assembly comprising:
    a cradle including a sidewall, a resilient member, and ramp member disposed on the sidewall, the cradle further including a backbone and a support member spaced from the backbone; and
    an accessory positioned in the cradle and held in the cradle by the resilient member,
    wherein the ramp member is positioned to guide the accessory into the cradle, and
    wherein the accessory is positioned between the support member and the backbone.

12. A bicycle accessory assembly as claimed in claim 11, wherein the sidewall is coupled to the backbone.

13. A bicycle accessory assembly as claimed in claim 11, wherein the support member is parallel with the backbone.

14. A bicycle accessory assembly as claimed in claim 13, wherein the ramp member is oblique to the support member.

15. A bicycle accessory assembly as claimed in claim 11, wherein the cradle includes a forked end spaced from the backbone.

16. A bicycle accessory assembly as claimed in claim 11, wherein the accessory comprises a tool.

17. A bicycle accessory assembly as claimed in claim 16, wherein the resilient member resiliently holds the tool engaged with the cradle.

18. A bicycle accessory assembly as claimed in claim 11, wherein the cradle further includes a ridge to define a snap-fit arrangement between the cradle and the accessory.

19. A bicycle comprising:
    front and rear wheels;
    a main frame including a mounting bracket having a first side flange and a second side flange cooperatively supporting a suspension pivot, the second side flange separated from the first side flange to define a space;
    a front fork connecting the main frame to the front wheel;
    a rear sub-frame connecting the main frame to the rear wheel and movable relative to the main frame;
    a shock positioned to dampen movement between the main frame and the sub-frame, the shock including a front mount secured to the suspension pivot; and
    a bicycle accessory positioned in the space.

* * * * *